United States Patent [19]

Wynosky et al.

[11] 4,290,262
[45] Sep. 22, 1981

[54] TWO-DIMENSIONAL PLUG NOZZLE

[75] Inventors: Thomas A. Wynosky, Madison, Conn.; Charles A. Campbell, Palm Beach Gardens, Fla.; Robert J. Mischke, Middletown, Conn.

[73] Assignee: United Technologies Corporation, Hartford, Conn.

[21] Appl. No.: 968,599

[22] Filed: Dec. 11, 1978

[51] Int. Cl.³ .............................................. F02K 3/06
[52] U.S. Cl. .................................................... 60/262
[58] Field of Search ................... 60/224, 226, 262, 263

[56] References Cited

U.S. PATENT DOCUMENTS

| | | | |
|---|---|---|---|
| 2,679,726 | 6/1954 | Moncrieff | 60/224 |
| 3,103,102 | 9/1963 | Sargent | 60/224 |
| 3,137,131 | 6/1964 | Tyler | 60/226 R |
| 3,340,689 | 9/1967 | Kueng | 60/226 R |
| 3,393,518 | 7/1968 | Bridge | 60/226 R |
| 3,433,244 | 3/1969 | Gardiner | 60/226 R |
| 3,659,422 | 5/1972 | Hope | 60/224 |

Primary Examiner—Robert E. Garrett
Attorney, Agent, or Firm—Norman Friedland

[57] ABSTRACT

The ducting extending a substantial axial length of a gas turbine engine is faired to transition the annular flows of the core engine and fan to a rectangular separate flow in a pair of two-dimensional exhaust nozzles so as to control each flow individually. Each flow is judiciously located to achieve noise control and infrared suppression.

4 Claims, 4 Drawing Figures

TWO-DIMENSIONAL PLUG NOZZLE

CROSS REFERENCE TO RELATED APPLICATIONS

The patent application Ser. No. 968,598 entitled TWO-DIMENSIONAL NOZZLE by T. A. Wynosky et al filed on Dec. 11, 1978 and also assigned to the same assignee as this patent application shows means for controlling the airstream in a two-dimensional nozzle for achieving optimum subsonic, supersonic flow conditions and proper internal and external nozzle expansion.

BACKGROUND OF THE INVENTION

This invention relates to aircraft powered by gas turbine engines and particularly to the two-dimensional, exhaust plug nozzle and means for achieving separate control of the fan and core engine airstreams.

The problem solved by this invention is the separate control of both the fan airstream and core engine airstream. We have found that by proper fairing of the conduits for both the fan air and the core air discharge it is possible to transition the annular flow to a rectangular flow and separate the two flows so that each can be separately controlled in the two-dimensional exhaust nozzle. By judicious location of the streams it is possible to minimize infrared detection from a ground-to-air missile and direct obnoxious noises away from the ground.

SUMMARY OF THE INVENTION

A feature of this invention is the separate exhaust nozzle control of both the fan air and engine core air of a turbofan engine. The annular flow of each airstream is directed to a two-dimensional plugged exhaust nozzle and the noisier and hotter stream is located behind the other stream with relationship to the ground.

Other features and advantages will be apparent from the specification and claims and from the accompanying drawings which illustrate an embodiment of the invention.

DESCRIPTION OF THE PREFERRED EMBODIMENT

While this invention is shown in schematic form, the mechanism for practicing the invention is within the skill of the ordinary artisan. As shown in the FIGS., the turbofan engine is of the type exemplified by state-of-the-art axial flow jet engines with fan duct burning (only that portion downstream of the compressor is shown). From the compressor (not shown) the core's primary air passes through the annular diffuser section 10, into its burner section 12, through the turbine section 14 in conventional manner and is exhausted in the exhaust section 16.

Figure 4:
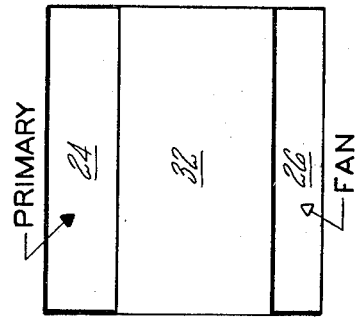
FIG. 4 is a section taken along the lines of 4—4 of FIG. 1.
Figure 3:
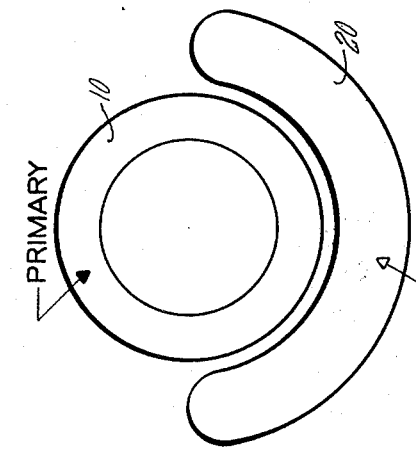
FIG. 3 is a section taken along lines 3—3 of FIG. 1.

In accordance with this invention the exhaust duct is faired from the annular section shown in FIG. 3 to the rectangular section shown in FIG. 4 and defines a two-dimensional nozzle.

Figure 2:
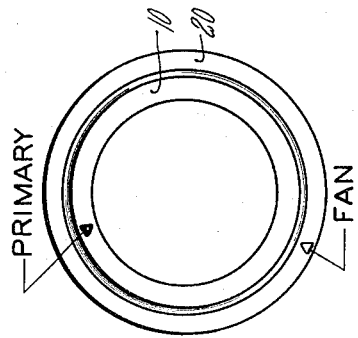
FIG. 2 is a section taken along lines 2—2 of FIG. 1.

Likewise, the fan duct 20 surrounding the core at the compressor discharge section is faired from the annular section shown in FIG. 2 to the rectangular section shown in FIG. 4 and likewise defining a two-dimensional nozzle. FIG. 3 shows the gradual transition from the annular to the rectangular section.

For the high speed engine of this type preferably duct burning would be included as is exemplified by the schematically shown burner 22.

From the foregoing it is apparent that each of the streams are maintained separate and the geometry of each are individually controlled which will be described hereinbelow.

Figure 1:
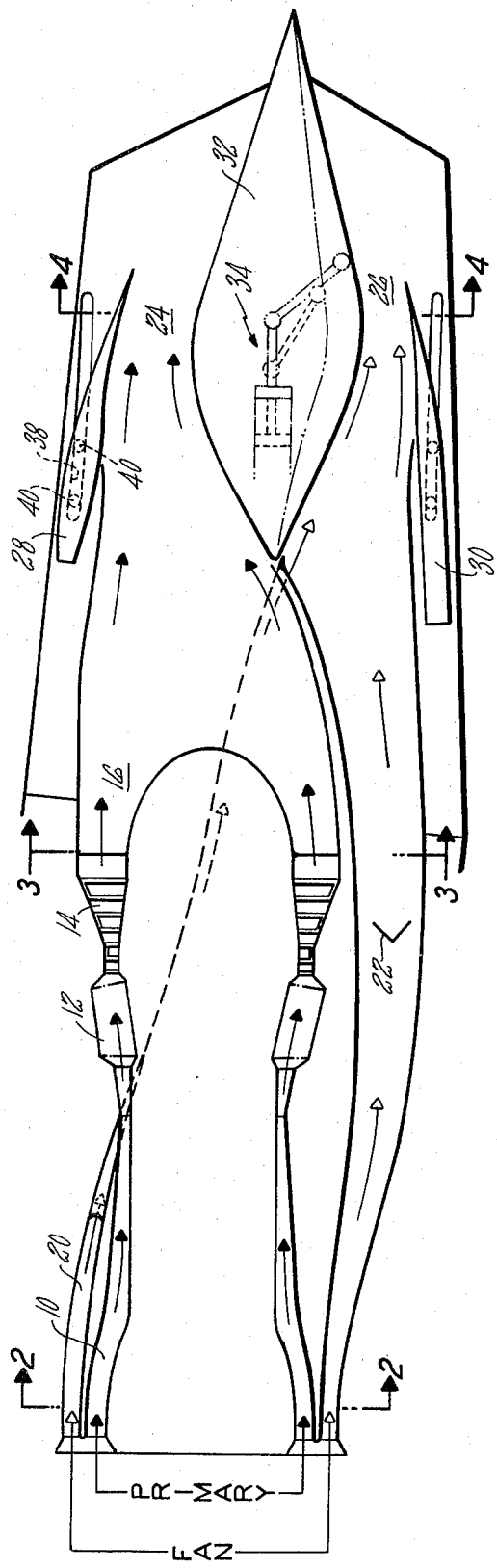
FIG. 1 is a schematic view of a partial turbojet engine illustrating the inventive concept.

As can be seen in FIG. 1 the primary air is discharged in the upper two-dimensional nozzle 24 of the pair of rectangular two-dimensional nozzles and the fan air is discharged from the lower two-dimensional nozzle 26 as viewed from the orientation of this Figure. This serves to keep the higher velocity stream higher than the lower velocity stream, assuming that the core air is hotter and faster than the fan air and assuming that the engine is mounted on the aircraft in the same orientation. The hotter, noisier stream is further away from the ground level and somewhat protected by the fan stream and its ducting. This has a dual purpose, namely (1) it keeps the noisier stream away from ground level and hence the noise emanates in a direction away from the ground for better noise suppression and (2) since the hotter stream is away from the ground and somewhat protected, it is somewhat shielded from ground-to-air infrared missiles.

Flaps 28 and 30 extend the length of the upper and lower walls of two-dimensional nozzles 24 and 26, respectively and preferably each are movable in a radial and axial direction to change the geometry of each of these nozzles.

Plug 32 forms the bottom wall of nozzle 24 and the top of nozzle 26 and preferably the latter surface of plug 32 is movable to change the throat area of the nozzle 26 and assures proper downstream expansion of the exhaust gas. As schematically shown, actuator 34 serves to move the panel of plug 32. While the detail construction of this plug and other components (not shown) the hardware for practicing this invention are well known and for further details reference should be made to say, U.S. Pat. No. 4,093,157, granted on June 6, 1978 to R. B. Cavanagh et al.

So as to move flap 28 radially and axially, cam slot 38 formed in the vertical wall of nozzle 24 serves to guide the flap which is moved by any well known actuator means (not shown). Rollers 40 attached to the end of flap 28 rides in cam slot 38 to achieve this movement and thereby obtaining the proper geometry for the given flight envelope.

It should be understood that the invention is not limited to the particular embodiments shown and described herein, but that various changes and modifications may be made without departing from the spirit and scope of this novel concept as defined by the following claims.

We claim:

1. For a fan jet engine having a primary core section for developing a fluid working medium in an annular cross-sectional flow stream and a fan section for developing a fluid working medium in an annular cross-sectional flow stream and each stream at a given location being in concentric relationship, means for forming said stream in a rectangular cross-sectional relationship including a first ducting means for transitioning the primary core fluid working medium in a two-dimensional nozzle configuration, a second ducting means for transitioning the fan fluid working medium in a separate two-dimensional nozzle configuration, means for changing the geometry of each of said two-dimensional nozzle configurations independently of each other and a central plug centrally disposed at the downstream end of said fan jet engine and having wall portions, said wall portions defining a wall of each of said two-dimensional nozzles.

2. Apparatus as in claim 1 wherein said primary core section develops the hotter and higher velocity fluid working medium in the two-dimensional nozzle and said fan section develops a cooler and lower velocity working medium and locating said first and said second ducting means so that the hotter and higher velocity working medium is above the cooler and lower velocity working medium relative to the earth's horizon.

3. Apparatus as in claim 1 including flap means forming one wall in each of said two-dimensional nozzles for changing the geometry thereof and being disposed in a transverse plane including said central plug.

4. Apparatus as in claim 1 including means for adjusting the wall portion of said plug for varying the throat area of said two-dimensional nozzle receiving said fan fluid working medium.

* * * * *